(No Model.)
H. TERRY.
GATE.
No. 372,438. Patented Nov. 1, 1887.
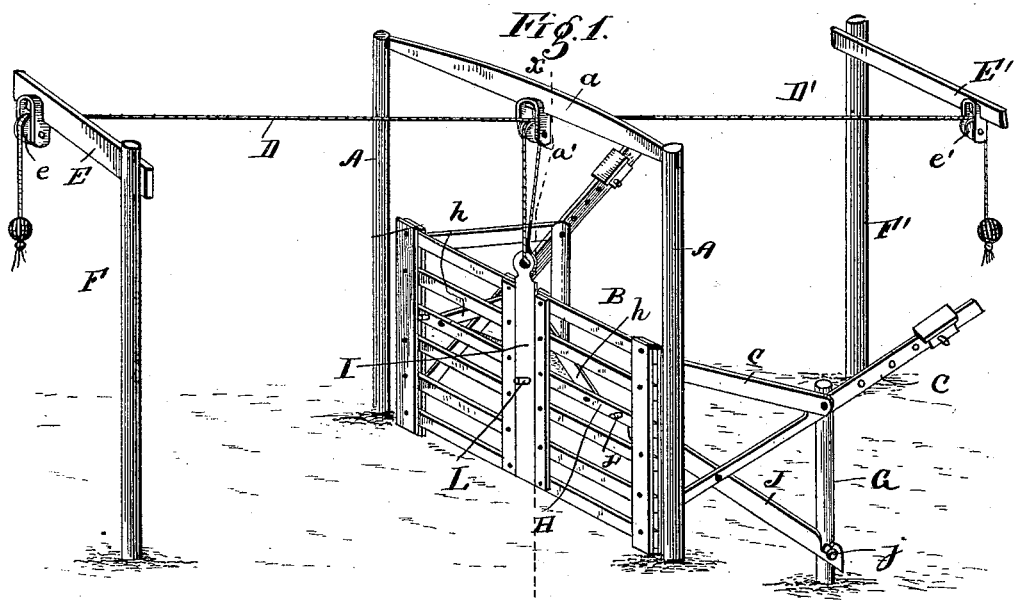
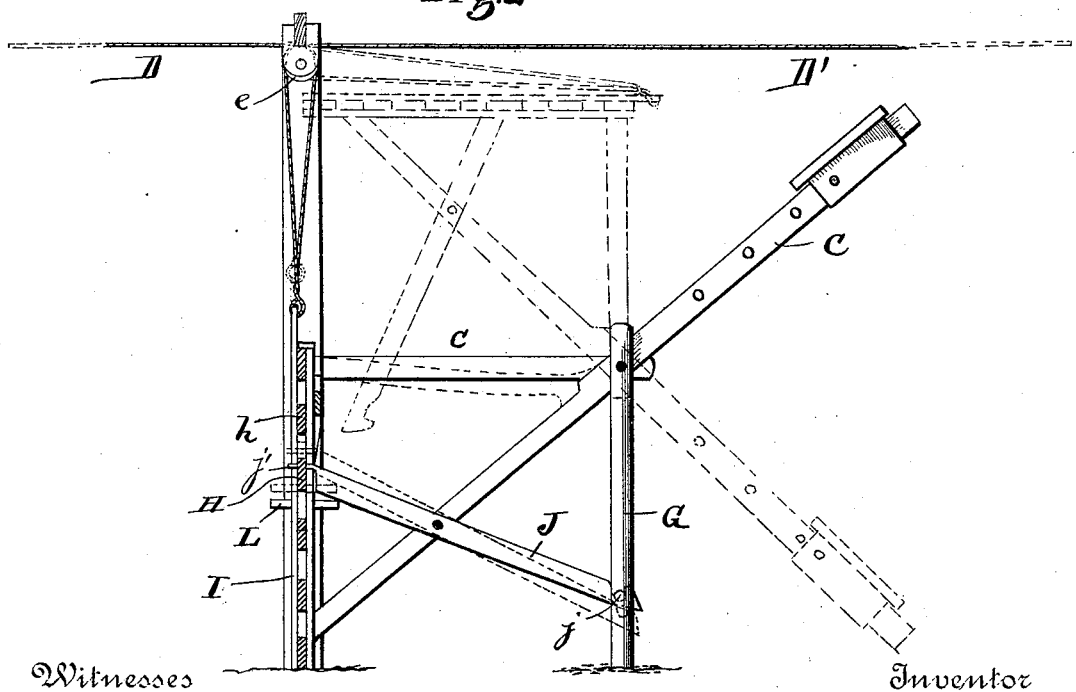
Witnesses
R. C. Laurie
L. Specht
Inventor
Hiram Terry
By his Attorneys
R. S. & A. P. Lacey

UNITED STATES PATENT OFFICE.

HIRAM TERRY, OF BONHAM, TEXAS.

GATE.

SPECIFICATION forming part of Letters Patent No. 372,438, dated November 1, 1887.

Application filed May 31, 1887. Serial No. 239,871. (No model.)

*To all whom it may concern:*

Be it known that I, HIRAM TERRY, a citizen of the United States, residing at Bonham, in the county of Fannin and State of Texas, have invented certain new and useful Improvements in Gates; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to gates which are operated from either approach, and is chiefly designed as an improvement on that patented to me November 24, 1885, No. 331,168, and has for its object to simplify and improve the construction of this class of devices—to devise a construction, in short, which will be simple and compact in arrangement, economical in cost, easy to manage, efficient in operation, and not liable to get out of repair.

The operating-cords in my former patent were attached to the ends of the levers, which in turn were connected with the gate through intermediate devices, and separate cords were interposed between the main cords and the latches. This construction was necessarily complicated and involved quite a number of parts which were liable to get out of repair. The present construction dispenses with the separate cords and the devices interposed between the main operating-cords and the gate, and connects the cords directly to the latch mechanism which is carried by the gate, as will more fully hereinafter appear.

The improvement consists in the peculiar construction and combination of parts and the novel features presently to be described and claimed, and shown in the drawings, in which—

Figure 1 is a perspective view of a gate embodying my invention; and Fig. 2, a vertical central cross-section of the gate on the line X X of Fig. 1, showing the operation of the latch and the upward movement of the gate by dotted lines.

The frame composed of the posts A, arranged on each side of the roadway, and the cross-bar $a$, uniting the upper ends of the posts, forms a support for the gate-operating devices, which consist of the two strands D and D', extending in opposite directions, and passing over a pulley, $a'$, depending from the cross-bar $a$, and over the pulleys $e$ and $e'$, secured to the overhanging arms E and E', projected from the posts F and F', set at the sides of the road-bed and at a distance from the frame. The outer ends of the strands are weighted and extend within convenient reach of a person mounted on horseback or seated in a vehicle.

The gate B, of desired pattern, is extended across the roadway between the posts A, and is carried by the levers C, to the forward ends of which it is secured. The levers are pivoted about midway of their ends to the standards G, and have their outer ends weighted nearly to counterbalance the gate and facilitate the operation of the same. The front ends of the levers may be bifurcated, as shown by dotted lines in Fig. 2, and connected with the gate near the top and bottom; or the levers may be straight and have their front ends connected with the gate near its lower edge and have extra braces $c$ interposed between the levers and the upper ends of the gate.

The cross-bar H, which may be one of the slats of the gate, is adapted to have a vertical movement within certain limits, and is secured at its middle to the vertical slide I, and strengthened by the braces $h$ on each side of the slide connecting it with the cross-bar. The latch-levers J, pivoted to the levers C, have their front ends engaged by the cross bar, (which is provided with openings near its ends for the reduced ends $j'$ of the latch-levers to pass through,) and have their rear ends hook-shaped or notched on their upper edge to engage with the stops $j'$, projected laterally from the standards G. The inner ends of the strands are attached to the upper end of the slide.

Normally the gate is down and extended across the roadway, as shown in Fig. 1, and is secured in this position against accidental displacement, by stock or otherwise, by the engagement of the lower ends of the latch-levers with the stops on the standards. A vertical movement of the slide elevates the cross-bar and the front ends of the latch-levers and disengages them from the stops, so that the gate is free to be thrown out of the way. The slide is provided on each side of the gate with hand-holds L, to be grasped by pedestrians when operating the gate. A pull upon either strand D or D' first elevates the slide and disengages the latch-levers from the standards, and a continued and quick pull elevates the gate, and the momentum of the parts carries the gate into the position shown by dotted lines in Fig. 2. A quick pull upon either strand when the gate is open suffices to close it, and the gravity of the side cross-bar braces and latch-levers is found sufficient to compel the engagement of the latch-levers with the stops and hold the gate closed.

Having thus described my invention, what I claim, and desire to secure by Letters Patent, is—

1. The combination, with the gate having a cross-bar, and mechanism, substantially as described, for operating the cross-bar and moving it vertically, the weighted levers, and the standards supporting the levers, of the latch-levers pivoted between their ends to the weighted levers and having their front ends engaged by the cross-bar, and the stops for engaging the rear ends of the latch-levers and holding the gate closed, substantially as described.

2. The combination, with the gate having the cross-bar provided with openings near each end, the slide and the braces, and devices, substantially as set forth, for pivotally supporting it, whereby it is free to be thrown up out of the way, of the latch-levers pivotally supported between their ends and having their front ends reduced and fitted in the openings in the cross-bar, and the stops for engaging with the latch-levers, substantially as and for the purpose described.

3. The combination, with a frame having a pulley, the posts located at a distance from the frame and having overhanging arms provided with pulleys, the two oppositely-disposed strands, the weighted levers, the standards supporting the levers, the gate having the slide, and the cross-bar connected with the slide, of the latch-levers pivoted upon the gate-carrying levers and having their front ends engaging with the cross-bar, and the stops projected from the standards and adapted to engage the rear ends of the latch levers, substantially as described.

4. The combination, with the gate having the slide, with hand-holds projected therefrom centrally disposed between its ends, a vertically-movable cross-bar, and connecting-braces, of the latch-levers, the stops, and the levers pivotally supporting the gate at each end, substantially as described, and for the purpose specified.

In testimony whereof I affix my signature in presence of two witnesses.

HIRAM TERRY.

Witnesses:
R. B. HILL,
A. S. WOODS.